United States Patent
Arora et al.

(10) Patent No.: US 8,840,019 B2
(45) Date of Patent: Sep. 23, 2014

(54) MOBILE DEVICE FINANCIAL TRANSACTIONS

(71) Applicant: International Business Machines Corporation, Armonk, NY (US)

(72) Inventors: Rajni Arora, Karnal (IN); Sachin Mahajan, Maharashtra (IN); Harpreet Singh, Punjab (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/901,881

(22) Filed: May 24, 2013

(65) Prior Publication Data
US 2013/0248596 A1 Sep. 26, 2013

Related U.S. Application Data

(63) Continuation of application No. 13/428,124, filed on Mar. 23, 2012, now Pat. No. 8,485,440.

(51) Int. Cl.
| | |
|---|---|
| *G06K 5/00* | (2006.01) |
| *G06Q 20/38* | (2012.01) |
| *G06Q 20/42* | (2012.01) |
| *G06Q 20/32* | (2012.01) |
| *G06Q 20/20* | (2012.01) |

(52) U.S. Cl.
CPC ............ *G06Q 20/322* (2013.01); *G06Q 20/385* (2013.01); *G06Q 20/425* (2013.01); *G06Q 20/325* (2013.01); *G06Q 20/3274* (2013.01); *G06Q 20/204* (2013.01)
USPC .......................................... 235/380; 235/382

(58) Field of Classification Search
USPC ................. 235/380, 382, 383; 705/41, 42, 44
See application file for complete search history.

(56) References Cited

U.S. PATENT DOCUMENTS

| | | | |
|---|---|---|---|
| 7,577,616 B2 | 8/2009 | Zhu | |
| 7,810,720 B2 | 10/2010 | Lovett | |

(Continued)

FOREIGN PATENT DOCUMENTS

WO 03023674 3/2003

OTHER PUBLICATIONS

Chowdhury et al., An Integrated Mechanism for Mobile Commerce, IADIS International Conference Wireless Applications and Computing 2007, pp. 79-86.

(Continued)

*Primary Examiner* — Ahshik Kim
(74) *Attorney, Agent, or Firm* — Schmeiser, Olsen & Watts; John Pivnichny

(57) ABSTRACT

A method and system for performing financial transactions. The method includes receiving by a mobile device, credit/debit card data belonging to a user of the mobile device. The credit/debit card data is registered with a financial transaction server and the user is authenticated. A USSD message comprising details associated with the user and a financial transaction is transmitted to a USSD server and a financial transaction server. In response, a random code representing the user and the credit/debit card data is received by the mobile device and a barcode is generated based on the random code. The bar code is presented to a merchant barcode scanner. The barcode is scanned, decoded, and transmitted to the financial transaction server. The decoded barcode is compared to the random code to perform a verification process associated with the financial transaction, the user, and credit/debit card data.

20 Claims, 3 Drawing Sheets

(56) References Cited

U.S. PATENT DOCUMENTS

| | | |
|---|---|---|
| 8,002,175 B2 | 8/2011 | Kuriyama et al. |
| 8,016,187 B2 | 9/2011 | Frantz et al. |
| 8,485,440 B1 | 7/2013 | Arora et al. |
| 2008/0167017 A1 | 7/2008 | Wentker et al. |
| 2008/0172317 A1 | 7/2008 | Deibert et al. |
| 2010/0008535 A1 | 1/2010 | Abulafia et al. |
| 2010/0009663 A1 | 1/2010 | Chang |
| 2010/0262543 A1 | 10/2010 | Shin et al. |
| 2011/0198395 A1 | 8/2011 | Chen |
| 2012/0089514 A1* | 4/2012 | Kraemling et al. ............. 705/42 |
| 2013/0073365 A1* | 3/2013 | McCarthy .................. 705/14.23 |

OTHER PUBLICATIONS

Creative Barcode congratulates ACID on launch of IP Tracker, Apr. 28, 2011, http://www.creativebarcode.com/newsitem?item=29, 1 page.

Gao et al., A 2D Barcode-Based Mobile Payment System, 2009 Third International Conference on Multimedia and Ubiquitous Engineering, 978-0-7695-3658-3/09, 2009 IEEE, DOI 10.1109/MUE.2009.62, pp. 320-329.

Meepass, 3 pages, http://www.meepass.com; retrieved from the Internet Dec. 8, 2011; MTAG 2009 International patent: PCT/FR2008/001581.

Layton, Can you use a cell phone as a credit card?, http://electronics.howstuffworks.com/nfc-phone.htm; retrieved from the Internet Dec. 8, 2011; 2 pages.

Office Action (Mail Date Nov. 9, 2012) for U.S. Appl. No. 13/428,124, filed Mar. 23, 2012.

Amendment filed Dec. 24, 2012 in response to Office Action (Mail Date Nov. 9, 2012) for U.S. Appl. No. 13/428,124, filed Mar. 23, 2012.

Notice of Allowance (Mail Date Mar. 8, 2012) for U.S. Appl. No. 13/428,124, filed Mar. 23, 2012.

Adelante; MobilePOS; Flexible mobile real-time credit/debit card payments via your Mobile Phone; Nov. 25, 2011; http://www.adelante.co.uk/product%20pdfs/MobilePOS.pdf; 2 pages.

\* cited by examiner

MOBILE DEVICE FINANCIAL TRANSACTIONS

This application is a continuation application claiming priority to Ser. No. 13/428,124, filed Mar. 23, 2012, now U.S. Pat. No. 8,485,440, issued Jul. 16, 2013.

FIELD

The present invention relates to a method and associated system for enabling secure financial transaction for non-GPRS mobile devices.

BACKGROUND

Performing a purchasing process typically comprises an inaccurate process with little flexibility. Allowing device to access purchasing data within a system may include a complicated process that may be time consuming and require a large amount of resources. Accordingly, there exists a need in the art to overcome at least some of the deficiencies and limitations described herein.

SUMMARY

The present invention provides a method comprising: enabling, by a mobile device comprising a computer processor, a mobile software application comprising a GUI, an authentication module, and a communication module; receiving, by the computer processor, credit/debit card data associated with a credit/debit card belonging to a user of the mobile device; registering, by the computer processor, the credit/debit card with a financial transaction server; authenticating, by the computer processor executing the authentication module, a user of the mobile device with respect to a financial transaction associated with the user, the authenticating based on an entered alpha/numeric string received by the GUI; transmitting, by the computer processor in response to the authenticating, a USSD message to a USSD server, the USSD message comprising details associated with the user and the financial transaction, wherein the USSD message is transmitted to the financial transaction server via a secure communication channel; receiving, by the computer processor from the financial transaction server, a random code generated by the financial transaction server, the random code representing the user and the credit/debit card data; generating, by the computer processor, a barcode based on the random code; and presenting, by the computer processor to a merchant barcode scanner via a display device of the mobile device, the barcode, wherein the barcode is scanned, decoded, and transmitted by the barcode scanner to the financial transaction server, and wherein the decoded barcode is compared to the random code to perform a verification process associated with the financial transaction, the user and, the credit/debit card.

The present invention provides computer program product, comprising a computer readable storage device storing a computer readable program code, the computer readable program code comprising an algorithm that when executed by a computer processor of a mobile device implements a method, the method comprising: enabling, by the computer processor, a mobile software application comprising a GUI, an authentication module, and a communication module; receiving, by the computer processor, credit/debit card data associated with a credit/debit card belonging to a user of the mobile device; registering, by the computer processor, the credit/debit card with a financial transaction server; authenticating, by the computer processor executing the authentication module, a user of the mobile device with respect to a financial transaction associated with the user, the authenticating based on an entered alpha/numeric string received by the GUI; transmitting, by the computer processor in response to the authenticating, a USSD message to a USSD server, the USSD message comprising details associated with the user and the financial transaction, wherein the USSD message is transmitted to the financial transaction server via a secure communication channel; receiving, by the computer processor from the financial transaction server, a random code generated by the financial transaction server, the random code representing the user and the credit/debit card data; generating, by the computer processor, a barcode based on the random code; and presenting, by the computer processor to a merchant barcode scanner via a display device of the mobile device, the barcode, wherein the barcode is scanned, decoded, and transmitted by the barcode scanner to the financial transaction server, and wherein the decoded barcode is compared to the random code to perform a verification process associated with the financial transaction, the user and, the credit/debit card.

The present invention provides computer system comprising a computer processor coupled to a computer-readable memory unit, the memory unit comprising instructions that when executed by the computer processor implements a method comprising: enabling, by the computer processor, a mobile software application comprising a GUI, an authentication module, and a communication module; receiving, by the computer processor, credit/debit card data associated with a credit/debit card belonging to a user of the mobile device; registering, by the computer processor, the credit/debit card with a financial transaction server; authenticating, by the computer processor executing the authentication module, a user of the mobile device with respect to a financial transaction associated with the user, the authenticating based on an entered alpha/numeric string received by the GUI; transmitting, by the computer processor in response to the authenticating, a USSD message to a USSD server, the USSD message comprising details associated with the user and the financial transaction, wherein the USSD message is transmitted to the financial transaction server via a secure communication channel; receiving, by the computer processor from the financial transaction server, a random code generated by the financial transaction server, the random code representing the user and the credit/debit card data; generating, by the computer processor, a barcode based on the random code; and presenting, by the computer processor to a merchant barcode scanner via a display device of the mobile device, the barcode, wherein the barcode is scanned, decoded, and transmitted by the barcode scanner to the financial transaction server, and wherein the decoded barcode is compared to the random code to perform a verification process associated with the financial transaction, the user and, the credit/debit card.

The present invention advantageously provides a simple method and associated system capable of performing a purchasing process.

DETAILED DESCRIPTION

Figure 1:
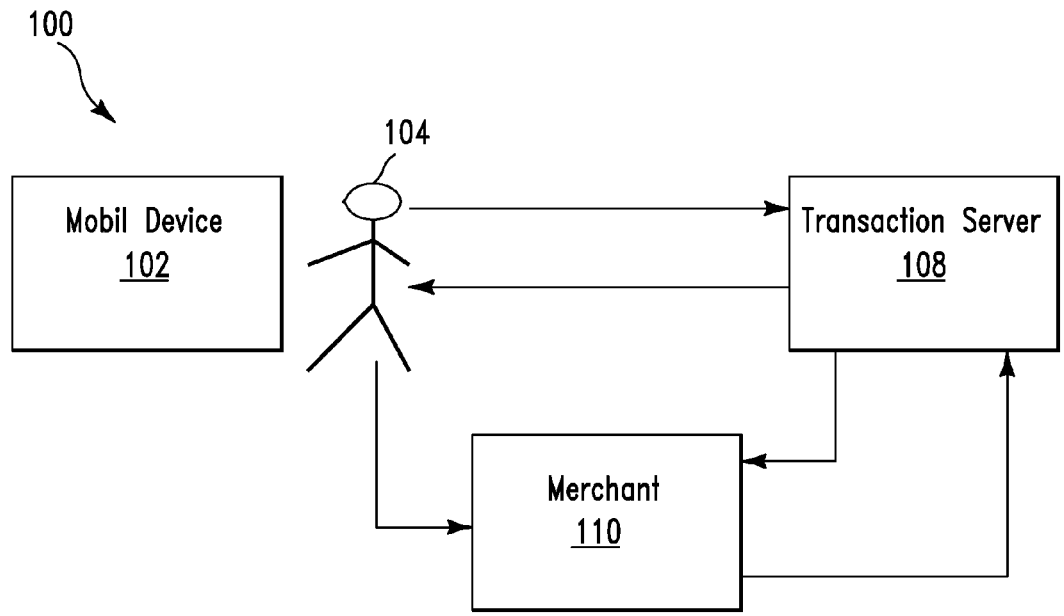
FIG. 1 illustrates a system for enabling secure financial transaction for mobile devices, in accordance with embodiments of the present invention.

FIG. 1 illustrates a system 100 for enabling secure financial transaction for mobile devices, in accordance with embodiments of the present invention. System 100 comprises a smart banking system for conducting credit card (or debit card) transactions through a mobile (handheld) device 102 of a user 104. Mobile device 102 may comprise any type of mobile device including, inter alia, a cellular telephone, a PDA, a tablet computer, etc. Mobile device 102 includes a mobile software application provided by credit/debit card service providers. System 100 enables a process for inputting user's 104 credit card details, verifying the credit card details, extracting an output that includes a unique barcode image (or any type of visual representation) representing the user's 104 credit/debit card. System 100 verifies:
1. Output details (associated with the barcode image) through the mobile software application.
2. Authorization of inputted monetary transactions via communications with a billing center associated with a credit company.

System 100 comprises a mobile device 102, a transaction server 108, and a merchant computer 110. Mobile device 102 includes a mobile software application for communication with a transaction server of a credit card issuing company. The communication may be performed using unstructured supplementary service data (USSD) messages. USSD comprises a protocol used by global system for mobile communications (GSM) cellular telephones to communicate with a service provider's computer. USSD may be used for WAP browsing, location-based content services, and menu-based information services. USSD messages comprise up to 182 alphanumeric characters in length. USSD messages create a real time connection during a USSD session. The connection remains open thereby allowing a two-way exchange for a sequence of data. Transaction server 108 comprises a transaction module for conducting monetary transactions through transaction server 108. The transaction module enables verifying authorization for executing transactions at billing center. Merchant computer 110 includes a bar code (or visual) analysis module for analyzing a bar code associated with a credit card application.

In order to enable system 100, user 104 will register and configure his/her credit/debit card with a card issuer company. The following steps enable use of the mobile software application in place of an actual credit/debit card:
1. User 104 installs the mobile software application (i.e., as a smart credit/debit card application).
2. User 104 registers the credit/debit card with an issuer company using the mobile software application.

The following steps enable use of the mobile software application to perform any monetary transactions:
1. User 104 opens (i.e., enables) the mobile software application. The mobile software application transmits a USSD message (comprising a specified code and data associated with user 104 and the credit/debit card to transaction server 108.
2. Transaction server 108 will verifies and authenticates the data and transmits associated information to the mobile software application via USSD messages. The mobile software application generates a bar code (on a display of mobile device 103) based on the information provided by transaction server 108.
3. The bar code is read by a bar code reader (of merchant computer 110) and exchanges associated information with transaction server 108 to verify user 104.
4. After user 104 has been verified, a transaction is performed by transaction server 108 (i.e., from the user's account to a merchant's account).
5. Transaction server 108 transmits a status code indicating completion of the transaction.

Figure 2:
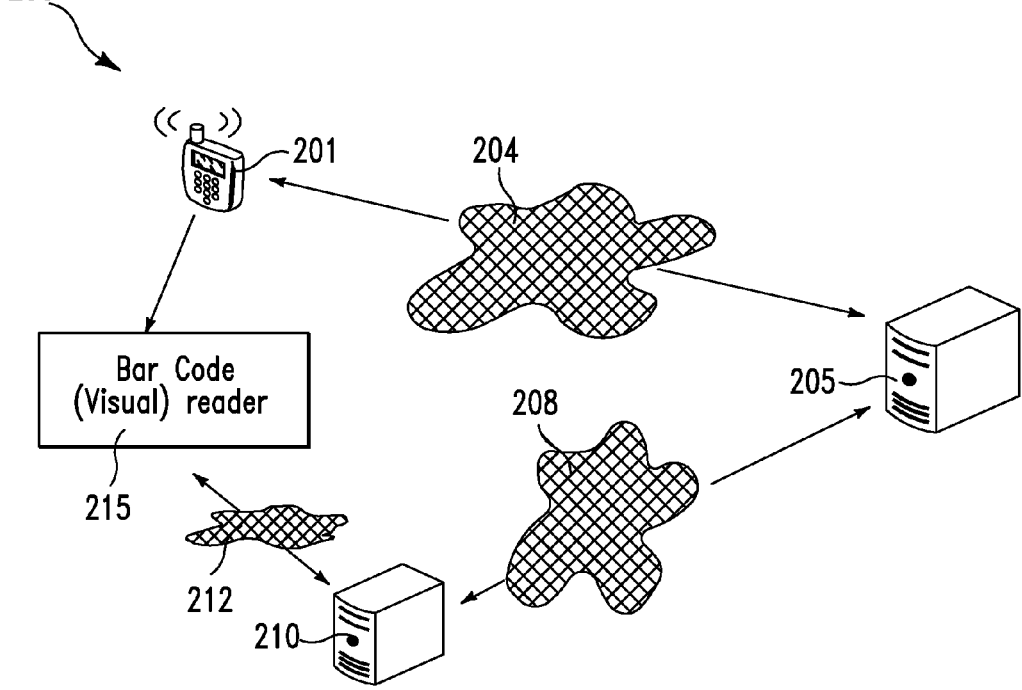
FIG. 2 illustrates a detailed system for enabling secure financial transaction for mobile devices, in accordance with embodiments of the present invention

FIG. 2 illustrates a system 200 for enabling secure financial transaction for mobile devices, in accordance with embodiments of the present invention. System 200 comprises a more detailed system 200 than system 100 of FIG. 1. System 200 comprises a mobile device 201 comprising a mobile software application, a communication channel 204, a USSD server 205, a secure communication channel 208, a bank transaction server 210, a communication channel 212, and a bar code reader 215. System performs the following steps associated with performing a transaction:
1. A user (i.e., using mobile device 201) launches the mobile software application in mobile device 201. The mobile software application comprises a graphical user interface (GUI), an authentication module, and a communication module. The GUI provides a basic interface for a user to enter inputs such as, inter alia, a user authentication pin number, etc. The authentication module authenticates the user locally (on mobile device 201). When the user launches the mobile software application, the user is prompted to enter a secret code to determine proper authorization for access and use of the software application. In response, the mobile software application transmits the secret code to USSD server 205 for authentication. Upon successful authentication, the communication module communicates with USSD server 205 in order to exchange user information.
2. The mobile software application transmits a USSD message to USSD server 205 via communication channel 204. This USSD message comprises user, Credit/Debit card and financial transaction details.
3. USSD server 205 transmits the user details to transaction server 210 via communication channel 208. Communication channel 208 comprises any type of communication channel agreed upon between transaction server 210 and USSD server 205.
4. Transaction server 210 verifies the user details and generates a unique random code. The unique random code represents the user and associated credit/debit card. There will be a unique random code for each transaction. Transaction server 210 shares the generated unique random code with USSD server 205 via communication channel 208.
5. USSD server 205 transmits generated unique random code (as a USSD message) to the mobile software application via communication channel 204.
6. The mobile software application generates a bar code based on the unique random code transmitted by USSD server 205.
7. A merchant scans the bar code using bar code reader 215. Bar code reader 215 decodes the bar code.
8. A merchant transmits billing information (i.e., an amount, a user id, and an account number) to transaction server 210 via communication channel 212.
9. Transaction server 210 verifies the unique random code against a code shared by the transaction server 210 and USSD server 205. If the verification is acceptable, transaction server 210 performs a payment transaction or transmits an appropriate message back to the merchant.

Figure 3:
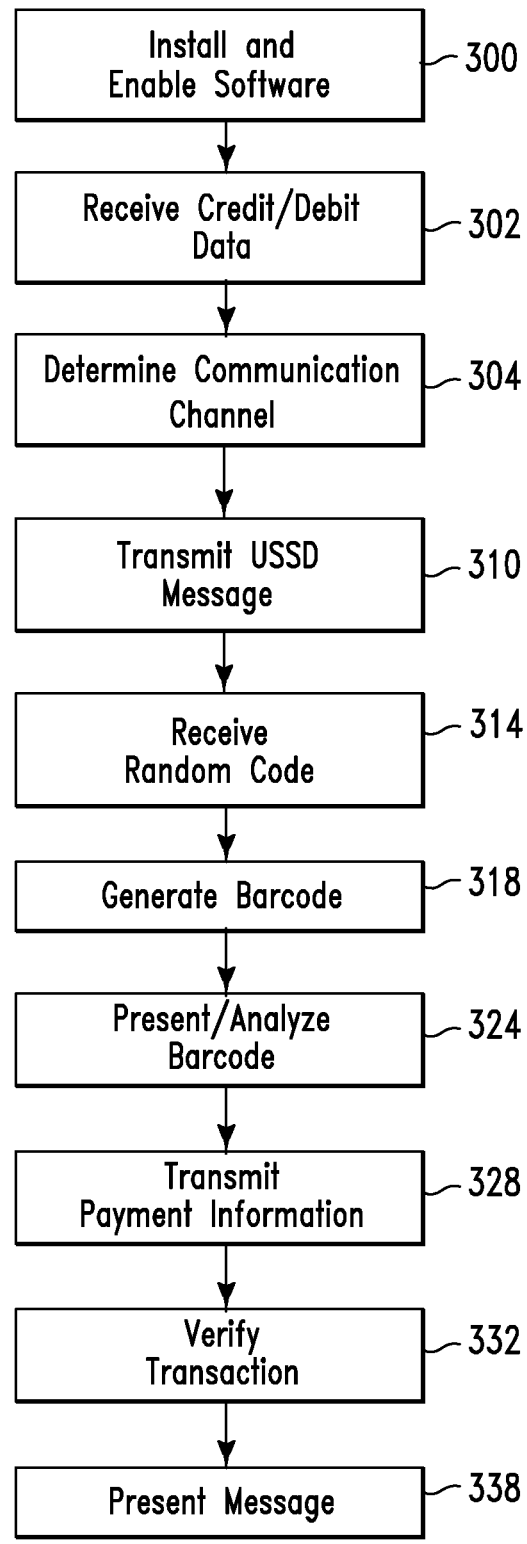
FIG. 3 illustrates an algorithm detailing a process flow enabled by the systems of FIGS. 1 and 2 for enabling secure financial transaction for mobile devices, in accordance with embodiments of the present invention.

FIG. 3 illustrates an algorithm detailing a process flow enabled by system 200 of FIG. 2 for enabling secure financial transaction for mobile devices, in accordance with embodiments of the present invention. In step 300, a mobile device comprising a computer processor (e.g., mobile device 103 in FIG. 1 or 201 in FIG. 2) installs and enables a mobile software application that includes a GUI, an authentication module, and a communication module. In step 302, the computer processor receives credit/debit card data associated with a credit/debit card belonging to a user of the mobile device. In step 304, the computer processor determining a specified communication channel for communications with a USSD server. In step 310, the computer processor transmits (in response to the authentication) a USSD message to a USSD server. The USSD message comprises details associated with the user and the financial transaction. The USSD message is transmitted to the financial transaction server via a secure communication channel. In step 314, if a user is successfully authenticated by the transaction server, the computer processor receives (from the financial transaction server) a random code generated by the financial transaction server or a decline message stating an unauthorized access restriction. The random code represents the user and the credit/debit card data. In step 318, the computer processor generates a barcode based on the random code. In step 324, the computer processor presents (to a merchant barcode scanner via a display device of the mobile device) the barcode. In step 328, the barcode is scanned, decoded, and transmitted (by the barcode scanner) to the financial transaction server. In step 332 the decoded barcode is compared to the random code to perform a verification process associated with the financial transaction, the user, and the credit/debit card. If the verification process determines that the financial transaction may be executed, the computer processor receives verification that the financial transaction has been executed and in step 338, the computer processor presents (to the user via the display device) the verification and a message indicating that the financial transaction has been executed is transmitted to the merchant. If the verification process determines that the financial transaction may not be executed then in step 338, the computer processor presents a message indicating that the financial transaction may not be executed.

Figure 4:
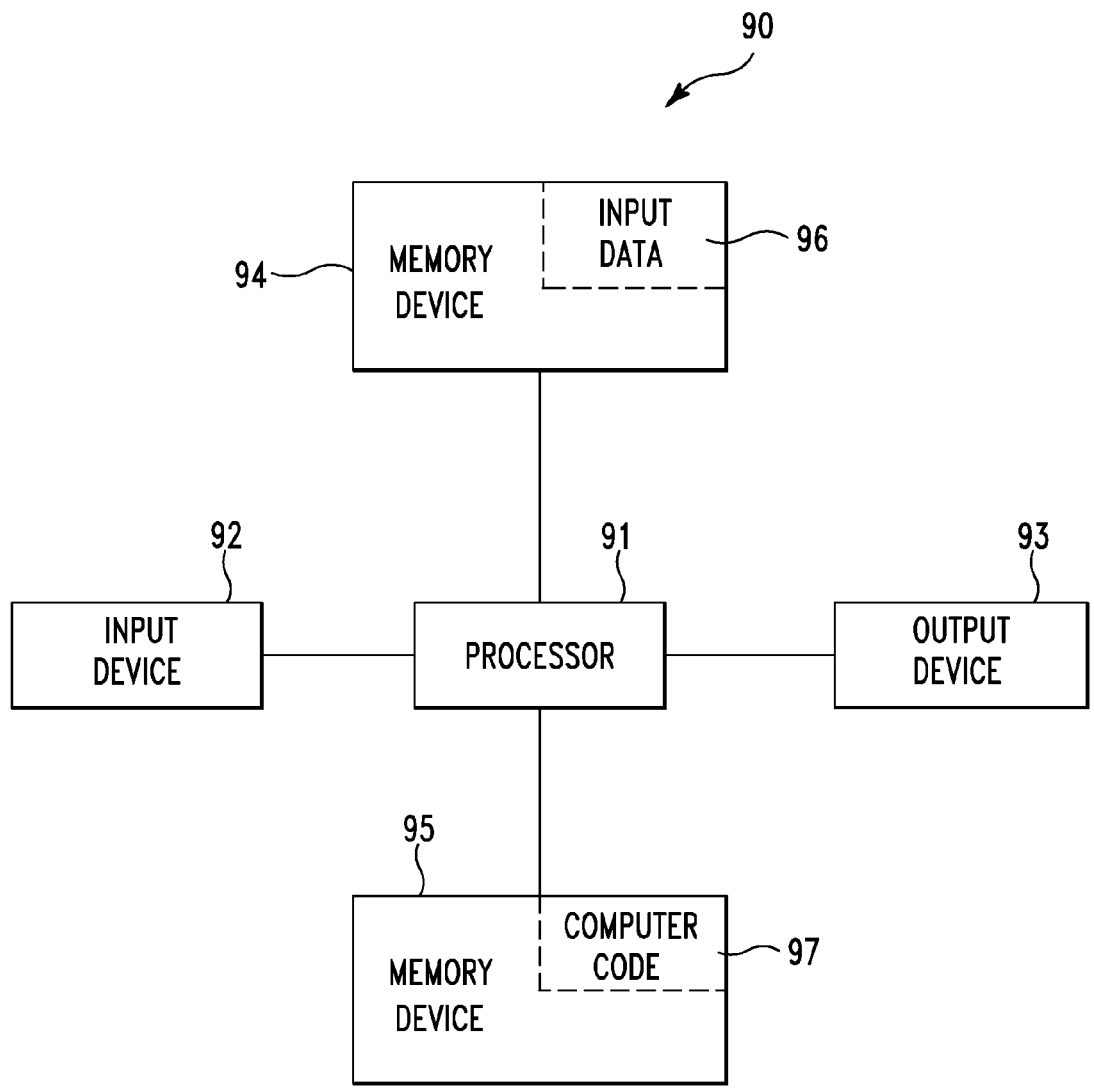
FIG. 4 illustrates a computer apparatus used by the systems of FIGS. 1 and 2 for enabling secure financial transaction for mobile devices, in accordance with embodiments of the present invention.

FIG. 4 illustrates a computer apparatus 90 used by systems 100 of FIGS. 1 and 200 of FIG. 2 for enabling secure financial transaction for mobile devices, in accordance with embodiments of the present invention. The computer system 90 comprises a processor 91, an input device 92 coupled to the processor 91, an output device 93 coupled to the processor 91, and memory devices 94 and 95 each coupled to the processor 91. The input device 92 may be, inter alia, a keyboard, a mouse, etc. The output device 93 may be, inter alia, a printer, a plotter, a computer screen, a magnetic tape, a removable hard disk, a floppy disk, etc. The memory devices 94 and 95 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 95 includes a computer code 97. The computer code 97 includes algorithms (e.g., the algorithm of FIG. 3) for enabling secure financial transaction for mobile devices. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices not shown in FIG. 4) may comprise the algorithm of FIG. 2 and may be used as a computer usable medium (or a computer readable medium or a program storage device) having a computer readable program code embodied therein and/or having other data stored therein, wherein the computer readable program code comprises the computer code 97. Generally, a computer program product (or, alternatively, an article of manufacture) of the computer system 90 may comprise the computer usable medium (or said program storage device).

Still yet, any of the components of the present invention could be created, integrated, hosted, maintained, deployed, managed, serviced, etc. by a service supplier who offers to enable secure financial transaction for mobile devices. Thus the present invention discloses a process for deploying, creating, integrating, hosting, maintaining, and/or integrating computing infrastructure, comprising integrating computer-readable code into the computer system 90, wherein the code in combination with the computer system 90 is capable of performing a method for enabling secure financial transaction for mobile devices. In another embodiment, the invention provides a business method that performs the process steps of the invention on a subscription, advertising, and/or fee basis. That is, a service supplier, such as a Solution Integrator, could offer to enable secure financial transaction for mobile devices. In this case, the service supplier can create, maintain, support, etc. a computer infrastructure that performs the process steps of the invention for one or more customers. In return, the service supplier can receive payment from the customer(s) under a subscription and/or fee agreement and/or the service supplier can receive payment from the sale of advertising content to one or more third parties.

While FIG. 4 shows the computer system 90 as a particular configuration of hardware and software, any configuration of hardware and software, as would be known to a person of ordinary skill in the art, may be utilized for the purposes stated supra in conjunction with the particular computer system 90 of FIG. 4. For example, the memory devices 94 and 95 may be portions of a single memory device rather than separate memory devices.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

The invention claimed is:

1. A method comprising:
   installing, by a mobile device comprising a computer processor, a mobile software application comprising a GUI, an authentication module, and a communication module;
   enabling, by said computer processor, said mobile software application;
   receiving, by said computer processor, credit/debit card data associated with a credit/debit card belonging to a user of said mobile device;
   determining, by said computer processor, a specified communication channel for communications;
   transmitting, by said computer processor via said specified communication channel, an unstructured supplementary service data (USSD) message to a USSD server, said USSD message comprising details associated with said user and a financial transaction associated with said user, wherein said USSD message is transmitted to a financial transaction server via a secure communication channel;

receiving, by said computer processor from said financial transaction server via said USSD server, a random code generated by said financial transaction server, said random code representing said user and said credit/debit card data;

generating, by said computer processor, a barcode based on said random code; and presenting, by said computer processor to a merchant barcode scanner via a display device of said mobile device, said barcode, wherein said barcode is scanned, decoded, and transmitted by said barcode scanner to said financial transaction server, and wherein said decoded barcode is compared to said random code to perform a verification process associated with said financial transaction, said user and, said credit/debit card.

2. The method of claim 1, wherein said verification process determines that said financial transaction may be executed, and wherein said method further comprises:

receiving, by said computer processor, verification that said financial transaction has been executed; and presenting, by said computer processor to said user via said display device, said verification.

3. The method of claim 2, further comprising:

transmitting, by said computer processor to a merchant associated with said financial transaction, a message indicating that said financial transaction has been executed.

4. The method of claim 1, wherein said verification process determines that said financial transaction may not be executed, and wherein said method further comprises:

presenting, by said computer processor to said user via said display device, a message indicating that said financial transaction may not be executed.

5. The method of claim 1, further comprising:

receiving, by said computer processor from said financial transaction server, a positive response associated with said random code generated by said financial transaction server, said positive response indicating that said random code is valid;

authorizing, by said computer processor in response to said receiving said positive response, said generating said barcode; and presenting, by said computer processor to said user via said display device, a message indicating said positive response.

6. The method of claim 1, wherein said mobile device comprises a device selected from the group consisting of a cellular telephone, a PDA, and a tablet computer.

7. The method of claim 1, wherein said barcode represents said debit/credit card.

8. The method of claim 1, further comprising:

providing at least one support service for at least one of creating, integrating, hosting, maintaining, and deploying computer-readable program code in the mobile device, said program code being executed by the computer processor to implement said enabling, said receiving said credit/debit card data, said transmitting, said receiving said random code, said generating, and said presenting.

9. A computer program product, comprising a computer readable storage device storing a computer readable program code, said computer readable program code comprising an algorithm that when executed by a computer processor of a mobile device implements a method, said method comprising:

installing, by said mobile device comprising a computer processor, a mobile software application comprising a GUI, an authentication module, and a communication module;

enabling, by said computer processor, said mobile software application;

receiving, by said computer processor, credit/debit card data associated with a credit/debit card belonging to a user of said mobile device;

determining, by said computer processor, a specified communication channel for communications;

transmitting, by said computer processor via said specified communication channel, an unstructured supplementary service data (USSD) message to a USSD server, said USSD message comprising details associated with said user and a financial transaction associated with said user, wherein said USSD message is transmitted to a financial transaction server via a secure communication channel;

receiving, by said computer processor from said financial transaction server via said USSD server, a random code generated by said financial transaction server, said random code representing said user and said credit/debit card data;

generating, by said computer processor, a barcode based on said random code; and presenting, by said computer processor to a merchant barcode scanner via a display device of said mobile device, said barcode, wherein said barcode is scanned, decoded, and transmitted by said barcode scanner to said financial transaction server, and wherein said decoded barcode is compared to said random code to perform a verification process associated with said financial transaction, said user and, said credit/debit card.

10. The computer program product of claim 9, wherein said verification process determines that said financial transaction may be executed, and wherein said method further comprises:

receiving, by said computer processor, verification that said financial transaction has been executed; and presenting, by said computer processor to said user via said display device, said verification.

11. The computer program product of claim 10, wherein said method further comprises:

transmitting, by said computer processor to a merchant associated with said financial transaction, a message indicating that said financial transaction has been executed.

12. The computer program product of claim 9, wherein said verification process determines that said financial transaction may not be executed, and wherein said method further comprises:

presenting, by said computer processor to said user via said display device, a message indicating that said financial transaction may not be executed.

13. The computer program product of claim 9, wherein said method further comprises:

receiving, by said computer processor from said financial transaction server, a positive response associated with said random code generated by said financial transaction server, said positive response indicating that said random code is valid;

authorizing, by said computer processor in response to said receiving said positive response, said generating said barcode; and presenting, by said computer processor to said user via said display device, a message indicating said positive response.

14. The computer program product of claim 9, wherein said mobile device comprises a device selected from the group consisting of a cellular telephone, a PDA, and a tablet computer.

15. The computer program product of claim 9, wherein said barcode represents said debit/credit card.

16. A computer system comprising a computer processor coupled to a computer-readable memory unit, said memory unit comprising instructions that when executed by the computer processor implements a method comprising:
- installing, by said computer processor, a mobile software application comprising a GUI, an authentication module, and a communication module;
- enabling, by said computer processor, said mobile software application;
- receiving, by said computer processor, credit/debit card data associated with a credit/debit card belonging to a user of said mobile device;
- determining, by said computer processor, a specified communication channel for communications;
- transmitting, by said computer processor via said specified communication channel, an unstructured supplementary service data (USSD) message to a USSD server, said USSD message comprising details associated with said user and a financial transaction associated with said user, wherein said USSD message is transmitted to a financial transaction server via a secure communication channel;
- receiving, by said computer processor from said financial transaction server via said USSD server, a random code generated by said financial transaction server, said random code representing said user and said credit/debit card data;
- generating, by said computer processor, a barcode based on said random code; and
- presenting, by said computer processor to a merchant barcode scanner via a display device of said mobile device, said barcode, wherein said barcode is scanned, decoded, and transmitted by said barcode scanner to said financial transaction server, and wherein said decoded barcode is compared to said random code to perform a verification process associated with said financial transaction, said user and, said credit/debit card.

17. The computer system of claim 16, wherein said verification process determines that said financial transaction may be executed, and wherein said method further comprises:
- receiving, by said computer processor, verification that said financial transaction has been executed; and
- presenting, by said computer processor to said user via said display device, said verification.

18. The computer system of claim 17, wherein said method further comprises:
- transmitting, by said computer processor to a merchant associated with said financial transaction, a message indicating that said financial transaction has been executed.

19. The computer system of claim 16, wherein said verification process determines that said financial transaction may not be executed, and wherein said method further comprises:
- presenting, by said computer processor to said user via said display device, a message indicating that said financial transaction may not be executed.

20. The computer system of claim 16, wherein said method further comprises:
- receiving, by said computer processor from said financial transaction server, a positive response associated with said random code generated by said financial transaction server, said positive response indicating that said random code is valid;
- authorizing, by said computer processor in response to said receiving said positive response, said generating said barcode; and
- presenting, by said computer processor to said user via said display device, a message indicating said positive response.

* * * * *